UNITED STATES PATENT OFFICE.

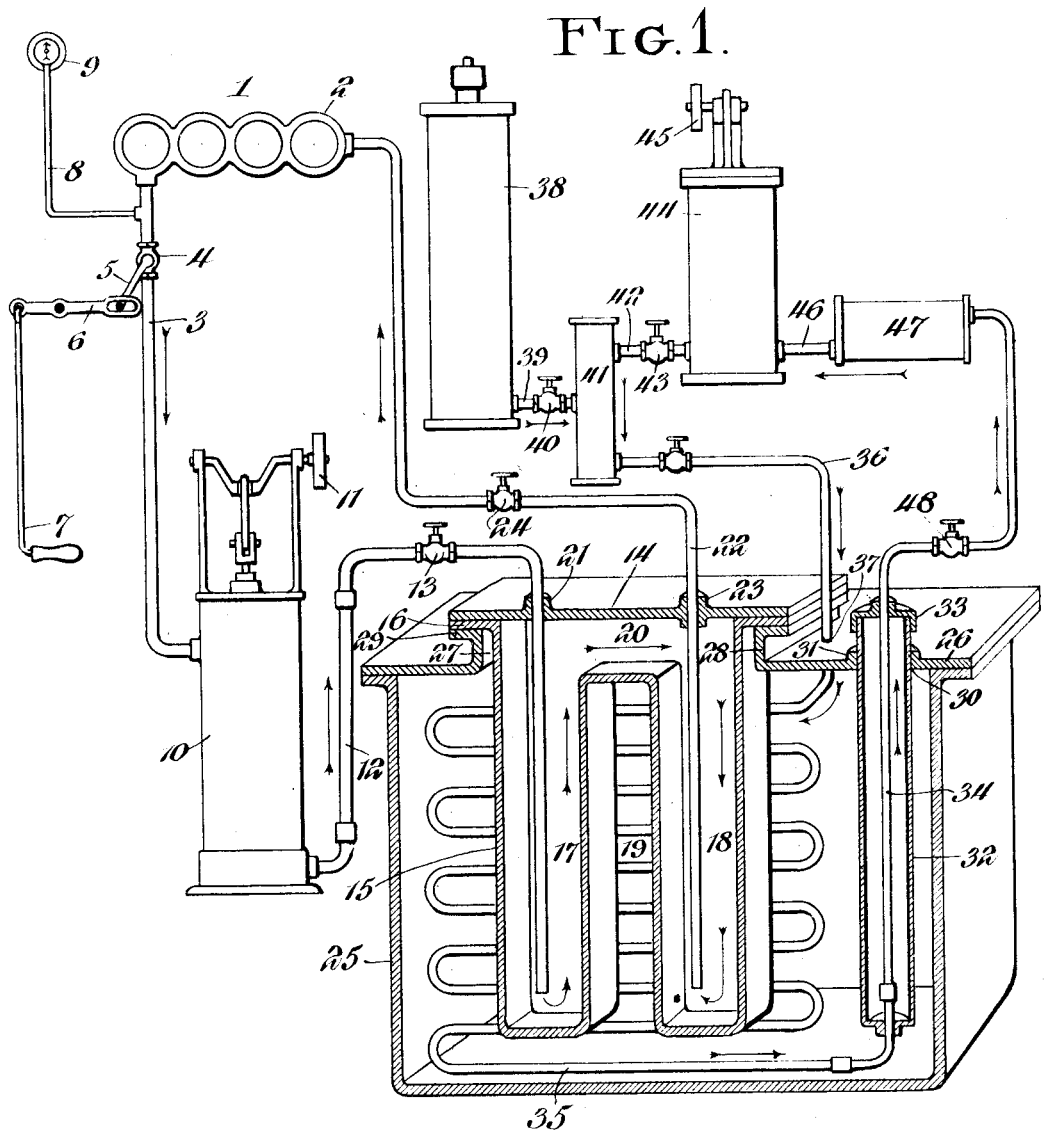

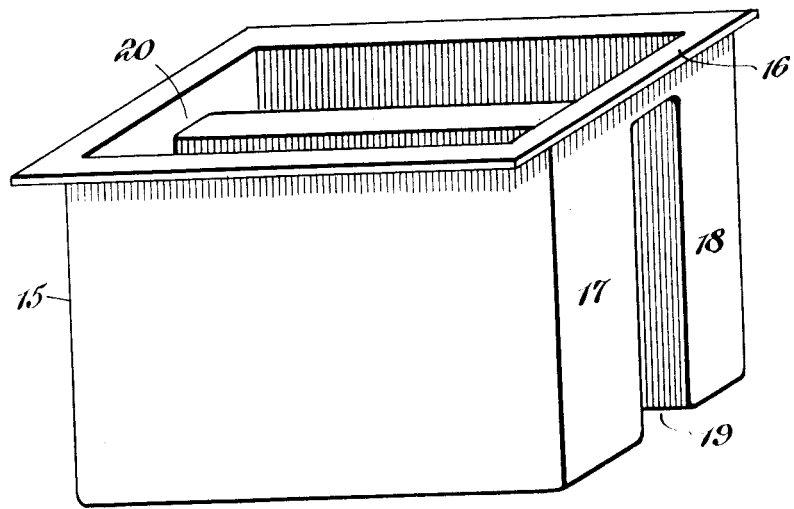
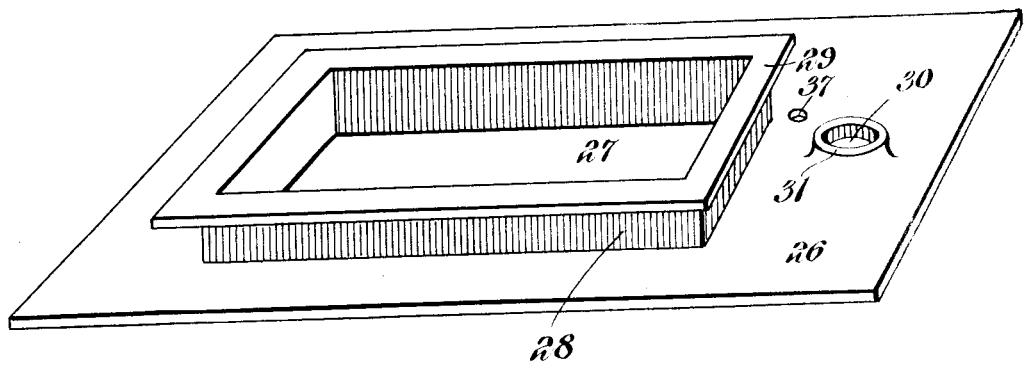

ZACHARIAH KEOUGH, OF SHELBY, OHIO.

COOLING MEANS FOR AUTOMOBILE-ENGINES.

1,190,771.  Specification of Letters Patent.  Patented July 11, 1916.

Application filed August 28, 1915. Serial No. 47,850.

*To all whom it may concern:*

Be it known that I, ZACHARIAH KEOUGH, a citizen of the United States, residing at Shelby, in the county of Richland and State of Ohio, have invented a new and useful Cooling Means for Automobile-Engines, of which the following is a specification.

This invention has reference to cooling means for explosion engines, and especially for the engines of automobiles, and its object is to obviate the necessity of employing water as a cooling agent and to avoid the necessity of a radiator such as is usually provided at the front of the hood of an automobile.

In accordance with the present invention air is employed as the cooling agent and the air is kept in circulation through the engine jacket by means of a suitable pump driven by the automobile engine. The air is pumped continuously through a closed circuit and through a portion of its course traverses a refrigerating chamber which may be lodged in a brine tank forming part of the refrigerating system of small size also receiving power from the automobile engine. Since the refrigerating system may be of the ammonia type, an ammonia pump is included in the refrigerating circuit, which pump receives its power from the automobile engine. Since ammonia and brine are the only liquids employed and neither freezes under such temperatures as the automobile is liable to encounter even in the severest winter weather, there is nothing about the cooling system to freeze so as to either stop its circulation or injure the parts.

Furthermore, since the circulating cooling medium for the engine is air, there is no liability of the circulating system running dry and so failing to act, as frequently occurs where water is depended upon for cooling the engine.

Furthermore, the refrigerating system may be situated at any point on the automobile, since no dependence is had upon atmospheric air circulation about a radiator.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings: Figure 1 is a diagrammatic representation with some parts shown in section of a refrigerating system embodying the present invention. Fig. 2 is a perspective view of the air chilling receptacle. Fig. 3 is a perspective view of the top or cover portion of the brine tank.

Referring to the drawings there is shown a diagrammatic representation of a multicylinder explosion engine 1 such as is customarily employed upon an automobile. The engine is provided with the usual water jacket 2 also diagrammatically represented, but in the present case the jacket is employed for the circulation of air about the cylinders of the engine instead of water.

Leading from one end of the cooling jacket 2 is a pipe 3 containing a valve 4 having a valve arm 5 under the control of a lever 6 in turn controllable by a handle member 7 which may extend to a suitable point of manipulation convenient to the driver of the vehicle. Branched off from the pipe 3 is another pipe 8 terminating in a temperature indicator 9 which may be located within plain view of the operator, so that the temperature of the cooling medium leaving the engine cooling jacket may be observed at any time. The pipe 3 at the end remote from the engine 1 leads into a pump 10 provided with a driving pulley 11 designed to receive power from some moving part of the engine. The structure of the pump 10 is not material to the present invention except that the pump may be of any known type capable of maintaining a circulation of air.

Leading from the discharge side of the pump 10 is a pipe 12 provided with a valve 13 and extending through a cover 14 applied to an otherwise closed tank 15 shown in Fig. 1 in section and separately in Fig. 2. This tank is formed with a marginal flange 16 at the top upon which the cover 14 rests, and to which it may be secured in any suitable manner, and the tank is formed with two depending legs 17, 18 with a space 19 between them. The adjacent walls of the legs 17 and 18 stop short of the top of the tank, wherefore the legs communicate by a passage 20 beneath the cover 14. The pipe 12 where extending through the cover 14 is surrounded by a boss 21 so that the pipe may be made to fit tightly, thus preventing escape of air. The pipe 12 is extended into the leg 17 of the tank 15 to near the bottom thereof and there freely opens into the tank. Also entering the tank 15 through the cover 14, but in line with the leg 18, is another pipe 22 communicating with the leg 18 near the bottom thereof, and where extending through the cover 14 the pipe 22 is surrounded by a boss 23 so that the pipe may make a tight fit with the cover. The pipe 22 includes a valve 24 and is continued to and communicates with the jacket 2 at the end remote from the pipe 3. There is thereby provided a closed circuit for air set into motion by the pump 10 through the pipe 12 into the leg 17 of the tank 15, which latter because of its use may be termed an air tank, and the air escaping from the pipe 12 travels through the leg 17 and by way of the passage 20 to the leg 18, there entering the pipe 22, and finally passing into the jacket 2. After circulating about the cylinders of the engine the air returns to the pump 10 by way of the pipe 3. The speed of the air current thus set up may be controlled by the valve 4. In passing through the air tank 15 the air has a chance to expand and therefore moves slowly, during which time it is subjected to chilling influences in a manner and by means to be described.

It is advisable to maintain the cylinders of the engine at some moderate temperature, say, about 150° to 160° F., although such temperature may be varied to a considerable extent. The temperature of the air leaving the cooling jacket 2 is shown by the temperature indicator 9, so that if it be found that the temperature is higher than it should be, a greater speed of circulation is obtained by moving the valve 4 toward the full open position, while should it appear that the temperature is getting lower than advisable, the valve 4 is moved toward the closed position. In this way an approximation to an even temperature is obtained at the will of the operator. Again, it occurs when an engine is put under heavy load that the temperature is liable to rise to a higher degree than is advisable for the best effects, whereupon the valve 4 may be opened if need be to its full extent, and so maintain the engine at a moderate temperature even under heavy load.

In order to properly chill the cooling air there is provided a brine tank 25 having a cover 26 shown separately in Fig. 3. This cover is formed with an opening 27 surrounded by an upstanding wall 28 terminating at the top in an outstanding flange 29. The opening 27 is such as to admit the air tank 15 with its flange 16 resting on the flange 29, and then with the cover 14 of the air tank in place the air tank 15 and cover 14 are made fast to the flange 29 in any suitable manner. Near one end of the opening 27 the cover 26 is formed with a passage 30 surrounded by a boss 31, and through this opening 30 a tubular member 32 extends reaching to near the bottom of the tank 25 and rising above the top thereof, and also fitting snugly in the boss 30. The tubular member 32 constituting an elongated chamber has at the upper end above the cover 26 a cap 33 through which a pipe 34 extends, which pipe is carried entirely through the chamber 32 and enters the interior of the tank 25 through the bottom of the chamber 32. The pipe 34 at the lower end is connected to one end of a coil 35 lodged in the tank 25 and adjacent to the air tank 15. The coil 35 while shown as a single coil, may be taken as indicative of a multiple coil arranged as may be found expedient in close relation to the tank 15. That end of the coil 35 remote from the pipe 34 is connected to another pipe 36 extending through the cover 26 by way of a hole 37 in the cover 26. There is also provided a storage or supply tank 38 for ammonia connected by a pipe 39 containing a valve 40 to a receiver 41. One end of the receiver is connected by a pipe 42 containing a valve 43 to the outlet side of an ammonia pump 44, the latter being provided with a pulley 45 whereby power from the engine of the automobile may be utilized for driving the pump 44. The other end of the receiver 41 is connected to the pipe 36, which latter contains a valve 45. The intake side of the pump 44 is connected by a pipe 46 to a condenser 47, which in turn is connected to that end of the pipe 34 remote from the pipe 35; the pipe 34 between the chamber 32 and condenser 47 containing a valve 48. In the operative condition of the cooling device the tank 36 contains a suitable quantity of brine such as is customarily employed in refrigerating plants.

The various structures entering into the refrigerating plant may be such as may be customarily employed in ammonia refrigerating plants, and so need no special description or showing.

The purpose of the refrigerating plant is to maintain brine within the tank 25 at a suitably low temperature, so that air passing through the air tank 15 is subjected to the chilling action of the brine. By making the tank 15 with depending legs through which the air must circulate, the air is carried over large cooling surfaces and by having the tank 15 of such size as to serve as an expansion chamber the air remains for a relatively long time within the air chamber 15, and hence becomes thoroughly chilled before being again directed to the engine cylinders, even though the current of air passes with relative rapidity to and from the cooling chamber of the engine. There is thus provided a means which may be placed any where in the automobile and which may be of relatively small size, comprising a refrigerating plant driven by the automobile engine and requiring a negligible amount of power for its actuation. This refrigerating plant provides a means for chilling a relatively large body of air which in its chilled condition is directed by power obtained from the engine through the cooling jackets of the engine cylinders, and is then carried back to the air cooling tank within the brine tank to be again chilled before being re-directed to the engine.

The whole structure is of simple and particularly efficient construction, requiring no attention except an occasional adjustment by the operator when such becomes necessary, and requiring neither protection nor other attention in freezing weather. Nor can harm come to the engine because of failure to maintain a suitable supply of cooling water, which condition frequently occurs in automobiles employing water as a cooling agent and a radiator for disposing of surplus heat. Moreover, liability of defective circulation which frequently occurs with water cooled engines is avoided by the air cooling system.

The cooling system may be placed in any out of the way part of the automobile, and takes but little space. Furthermore, the air cooling system of the present invention avoids any necessity of a radiator at the front of the engine inclosing hood.

While the cooling system has been described as practically applicable to an automobile engine, it will be understood that it is not necessarily confined to such an engine, but may be used in connection with stationary engines, if desired.

What is claimed is:—

1. A cooling system for explosion engines, comprising a refrigerating tank, refrigerating means connected with the tank, an air tank within the refrigerating tank, and air circulating means connected with the air tank and with the engine to be cooled, whereby air heated by radiation from the engine is directed through the air tank in the refrigerating tank to be cooled before being again directed to the engine.

2. A cooling system for explosion engines, comprising a refrigerating tank with means for maintaining the refrigerating tank in refrigerating condition, an air tank within the refrigerating tank, and a closed circulating system for the air connected with the air tank for directing air from the air tank through the engine to cool the latter and to direct heated air from the engine to the air tank for chilling said heated air.

3. A cooling system for explosion engines comprising a brine tank, a refrigerating system connected with the brine tank for maintaining the brine in a chilled condition, an air tank housed in the brine tank, and an air circulating system including cooling jackets for the engine cylinders and opening into and leading from the air tank.

4. A cooling system for explosion engines comprising a brine tank, a refrigerating system connected with the brine tank for maintaining the brine in a chilled condition, an air tank housed in the brine tank, and an air circulating system including cooling jackets for the engine cylinders and opening into and leading from the air tank, said air tank having leg portions in spaced relation with the air entering one leg portion near one end thereof and leaving the other leg portion near that end thereof remote from the part of the first leg entered by the air.

5. A cooling system for explosion engines, comprising a brine tank, refrigerating means for maintaining the brine in a chilled condition, an air tank entering the brine tank and provided with spaced leg portions each having one end closed with the leg portions communicating at the other end, and an air circulating system including cooling jackets for the engine cylinders, said air circulating system opening into the air tank by one leg thereof and leaving it by the other leg at points remote from the junction portions of the legs.

6. A cooling system for explosion engines, comprising a brine tank, refrigerating means for maintaining the brine in a chilled condition, an air tank within the brine tank having depending spaced legs joined at the upper ends, and an air circulating system including cooling jackets for the engine cylinders with one end of the air system opening into the air tank near the bottom of one leg and the other end of the system receiving air from the air tank near the bottom of the other leg of the tank.

7. A cooling system for explosion engines, comprising a brine tank, refrigerating means for maintaining the brine in a chilled condition, an air tank within the brine tank having depending spaced legs joined at the upper ends, and an air circulating system including cooling jackets for the engine cylinders with one end of the air system opening into the air tank near the bottom of one leg and the other end of the system receiving air from the air tank near the bottom of the other leg of the tank, said air tank being of large capacity with respect to the air circulating system to provide a sluggish travel of the air through the air tank for the thorough chilling of the air.

8. A cooling means for explosion engines, comprising a refrigerating system and a closed air circulating system including cooling jackets for the engine and an expansion tank for the air with the expansion tank in operative relation to the refrigerating system for chilling the air passing through the tank, said air circulating system having means included in it for controlling the passage of air and thereby the effect of the chilled air upon the engine.

In testimony that I claim the foregoing as my own I have hereto affixed my signature in the presence of two witnesses.

ZACHARIAH KEOUGH.

Witnesses:
  E. G. CLARK,
  H. K. BECK.